United States Patent [19]

Jackson et al.

[11] Patent Number: 5,664,175

[45] Date of Patent: Sep. 2, 1997

[54] METHOD AND SYSTEM FOR REPRIORITIZING CALENDAR ITEMS ON A DATA PROCESSING SYSTEM

[75] Inventors: Brion K. Jackson, Flower Mound; Paul L. Miller, Irving; William E. Warren, III, Richland Hills; Marvin L. Williams, Lewisville, all of Tex.

[73] Assignee: International Business Machines Corporation, Armonk, N.Y.

[21] Appl. No.: 106,467

[22] Filed: Aug. 13, 1993

[51] Int. Cl.⁶ .................................................. G06F 9/40
[52] U.S. Cl. ............................................ 395/607; 395/673
[58] Field of Search ............................... 395/650, 673, 395/607, 670, 672, 674, 675, 676, 677; 364/DIG. 1, 281.8, 230.1, 419.1, 401

[56] References Cited

U.S. PATENT DOCUMENTS

| | | | |
|---|---|---|---|
| 4,642,756 | 2/1987 | Sherrod | 395/673 |
| 4,796,194 | 1/1989 | Atherton | 364/468 |
| 5,093,794 | 3/1992 | Howie et al. | 364/468 |
| 5,099,431 | 3/1992 | Natarajan | 364/468 |
| 5,247,677 | 9/1993 | Welland et al. | 395/673 |
| 5,260,868 | 11/1993 | Gupta et al. | 364/402 |
| 5,448,731 | 9/1995 | Wong et al. | 395/673 |

OTHER PUBLICATIONS

Richardson, R., "Handy Windows and DOS Utilities". DCM, v. 10, n. 3, Sep. 1992, p. 80(3).
Baker, K.R., "Sequencing Ruler and Due-date Assignment Ma Job Shop", Management Suene V 30, N 9, 1984.

*Primary Examiner*—Kevin A. Kriess
*Attorney, Agent, or Firm*—Geoffrey A. Mantooth

[57] ABSTRACT

Calendar objects on a data processing system include an item, a due date and a priority value. The objects are reprioritized according to their due dates and priority values. For each object, a difference between the respective due date and a selected date is determined. The selected date is typically the current date. An importance value is determined by combining the difference with the priority value of each object. The objects are sorted and ranked according to their importance values. The sorted objects are then displayed to a user. If the due date is passed the selected date, then a past due notification is provided to the user for that object.

12 Claims, 4 Drawing Sheets

METHOD AND SYSTEM FOR REPRIORITIZING CALENDAR ITEMS ON A DATA PROCESSING SYSTEM

TECHNICAL FIELD OF THE INVENTION

The present invention relates to calendar methods and systems for use on data processing systems.

BACKGROUND OF THE INVENTION

Calendar methods and systems on data processing systems allow a user to electronically add, delete or modify to-do items or entries on a chronologically arranged schedule. Such an item may be a task which needs to be performed. For example, an item could be "Finish spreadsheet from boss", with a specified due date.

Of course, such items could be hand written into a paper calendar. But, one advantage of calendars implemented on data processing systems over paper type calendars is the ability to manipulate the scheduling data. Specifically, prior art programs allow a user to assign a priority or due date to an item when entered into the calendar. The calendar program then sorts the items and produces a listing of the items. Sorting can be either by priority or by due date. Sorting by priority produces a listing with the highest priority items listed first. Sorting by due dates produces a listing with the earliest due dates listed first. This provides the user with a convenient method of organizing the user's time.

However, the prior art does not allow sorting of items based on combined parameters. Such a sorting capability would allow dynamic prioritizing, wherein those items needing immediate attention could change on a day-to-day basis.

SUMMARY OF THE INVENTION

Therefore, it is an object of the present invention to provide a method and system for allowing a calendar on a data processing system to reprioritize items based on combined parameters.

The present invention reprtoritizes calendar objects on a data processing system for a selected date. The objects are obtained from a database on the data processing system. Each object has a due date and a priority value. For each object, a difference between the respective due date and the selected date is determined. The difference is combined with the respective priority Value to determine an importance of the object. The objects are then sorted according to the importance of each object.

The present invention reprtoritizes calendar objects according to a temporal attribute. The objects are provided with a priority attribute, which attribute establishes an order among the objects. This order is changed by the reprioritization of the present invention, which reprioritization determines the urgency of the object and weights the priority accordingly.

In one aspect of the present invention, it is determined if two objects have the same importance. If two objects have the same importance, then those objects are sorted by a predetermined parameter associated with the objects.

In still another aspect of the present invention, a list of the sorted objects is produced to a user. Objects having a due date that is past the selected date are flagged for the user. The produced list of objects has those objects with due dates within a predetermined range from the selected date.

BRIEF DESCRIPTION OF THE DRAWINGS

FIG. 2 is a flow chart showing the entry of data, such as due date and priority value. FIGS. 3a and 3b are flow charts showing the reprioritization of items.

DESCRIPTION OF THE INVENTION

Figure 1:
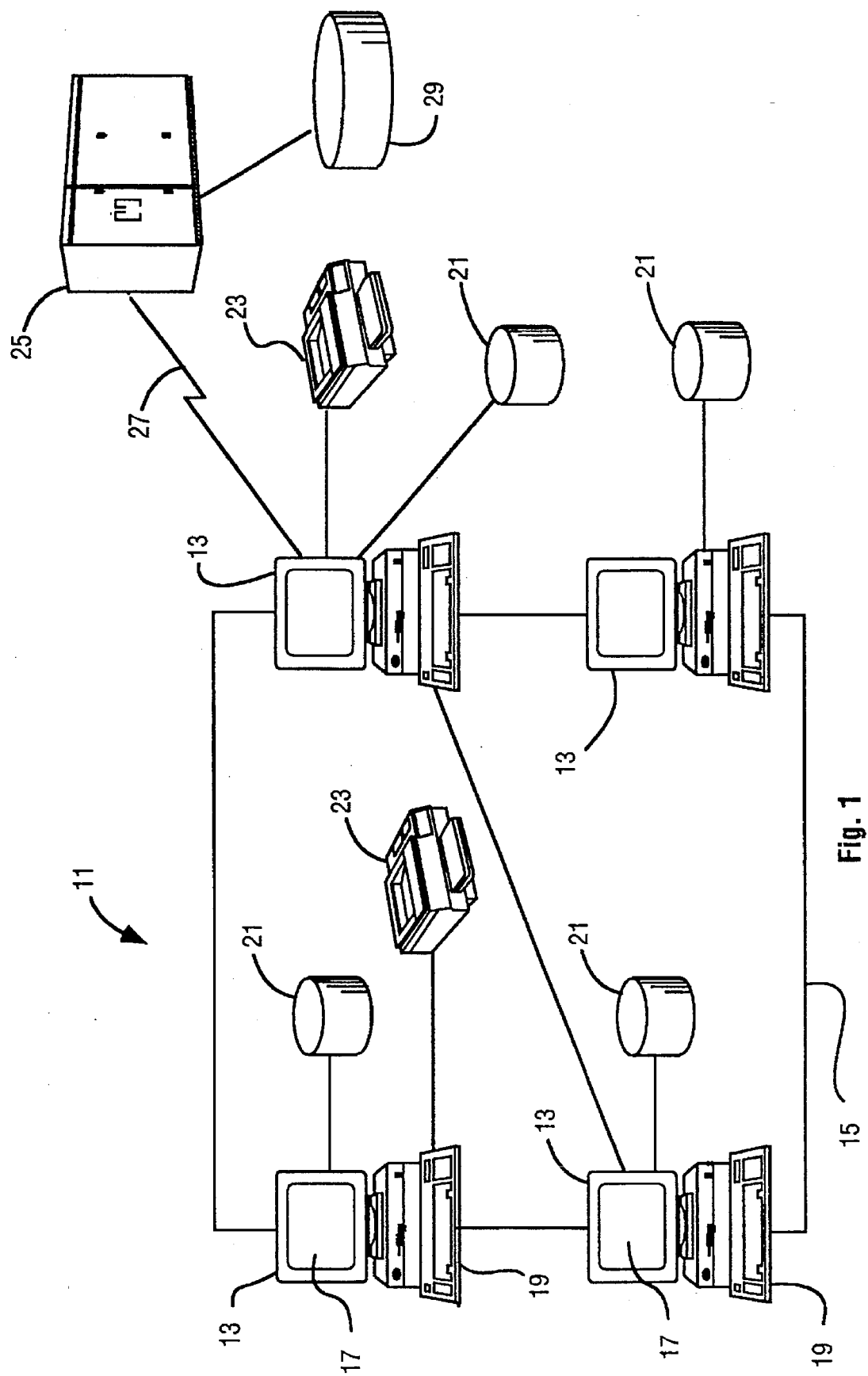
FIG. 1 is a schematic view of a data processing system, upon which the present invention can be practiced.

In FIG. 1, there is shown a schematic diagram of a data processing system 11, upon which the present invention can be practiced. The data processing system 11 includes plural individual computers or workstations 13 which are connected together in a local area network (LAN) 15. Each computer 13 includes a user interface, which has a display screen 17 and a keyboard 19. Each computer 13 may also be coupled to a storage device 21 and to a printer or output device 23. One or more of such storage devices 21 may be utilized, in accordance with the present invention, to store applications or resource objects which may be periodically accessed by any user within the data processing system 11. The present invention can be implemented on an individual computer 13.

The data processing system 11 may also include a mainframe or host computer 25 that is coupled to one of the workstations by a communication link 27. The host computer 25 may also be coupled to a storage device 29 which may serve as a remote storage for the computers.

One of the applications on one or more of the computers 13 is a calendar program. The calendar program allows a user to enter to-do items into the calendar or schedule. The to-do item can be a task that needs to be performed. The item is entered along with the due date and a priority value. The priority value ranks the importance of completing the item relative to the importance of completing the other items on the calendar. The item, together with its parameters, such as due date and priority value, make up an object. After the item has been entered, the user can change its due date and priority value.

Figure 2:
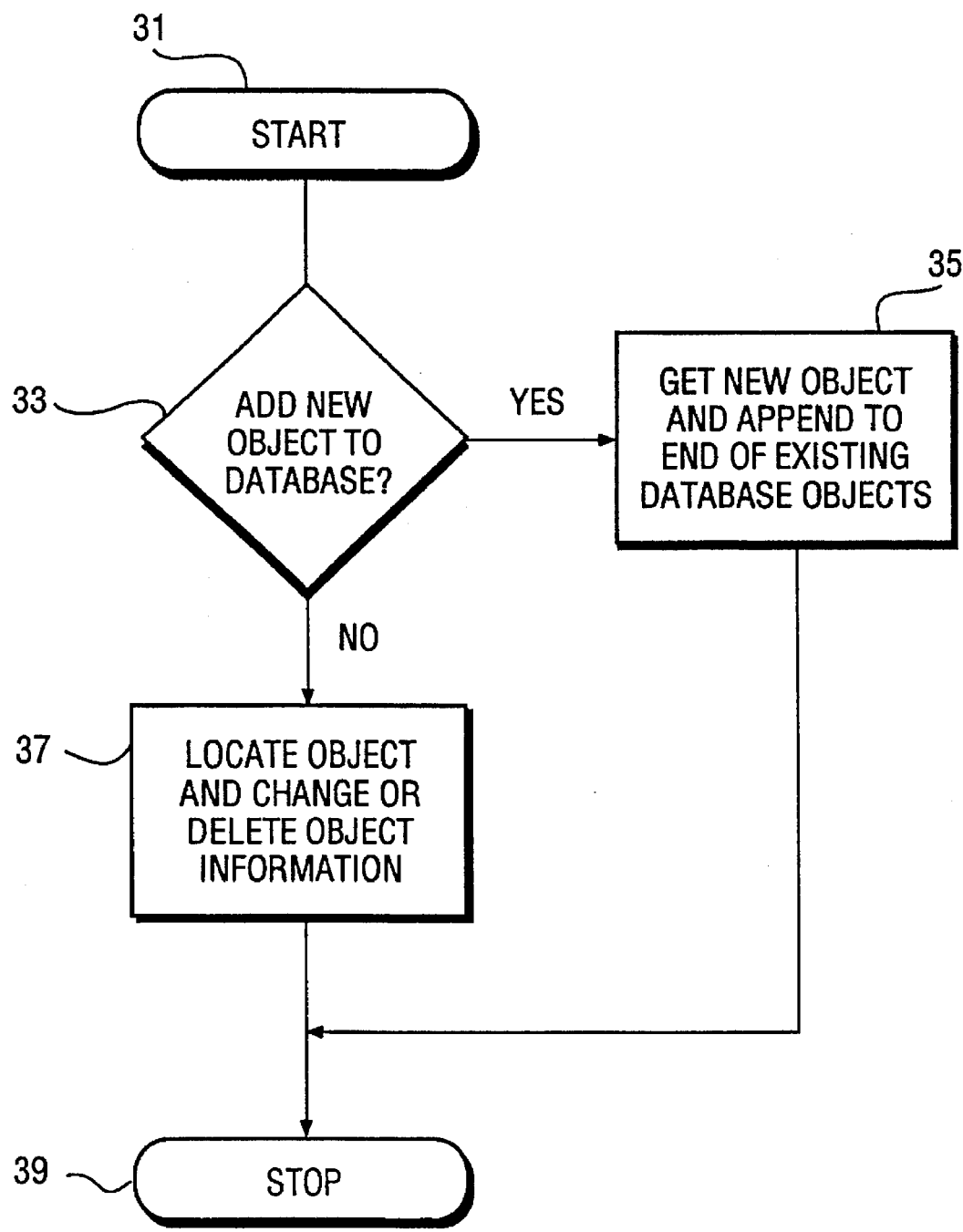
FIGS. 2, 3a, 3b are flow charts of the method of the present invention, in accordance with a preferred embodiment.
Figure 3A:
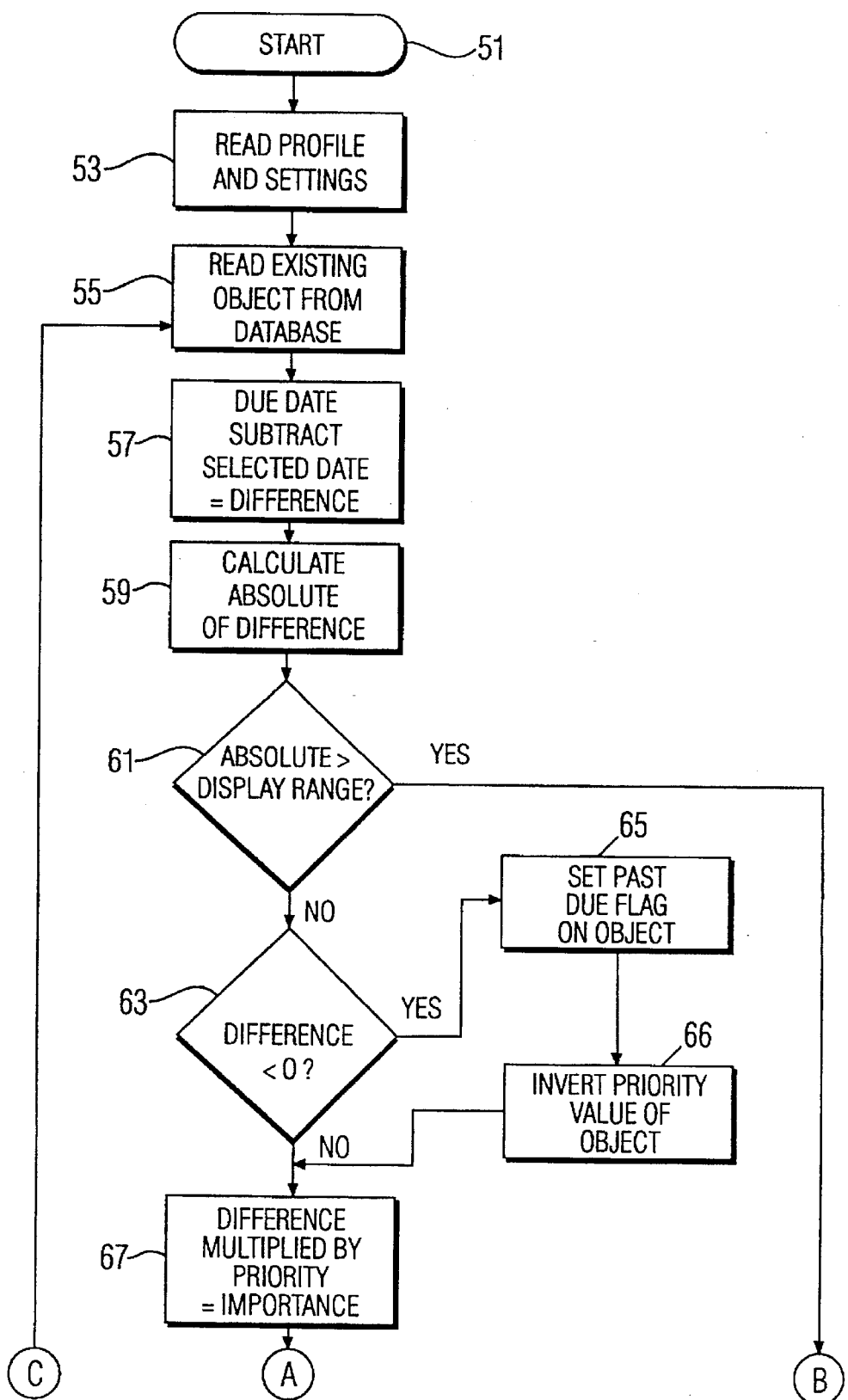
Figure 3B:
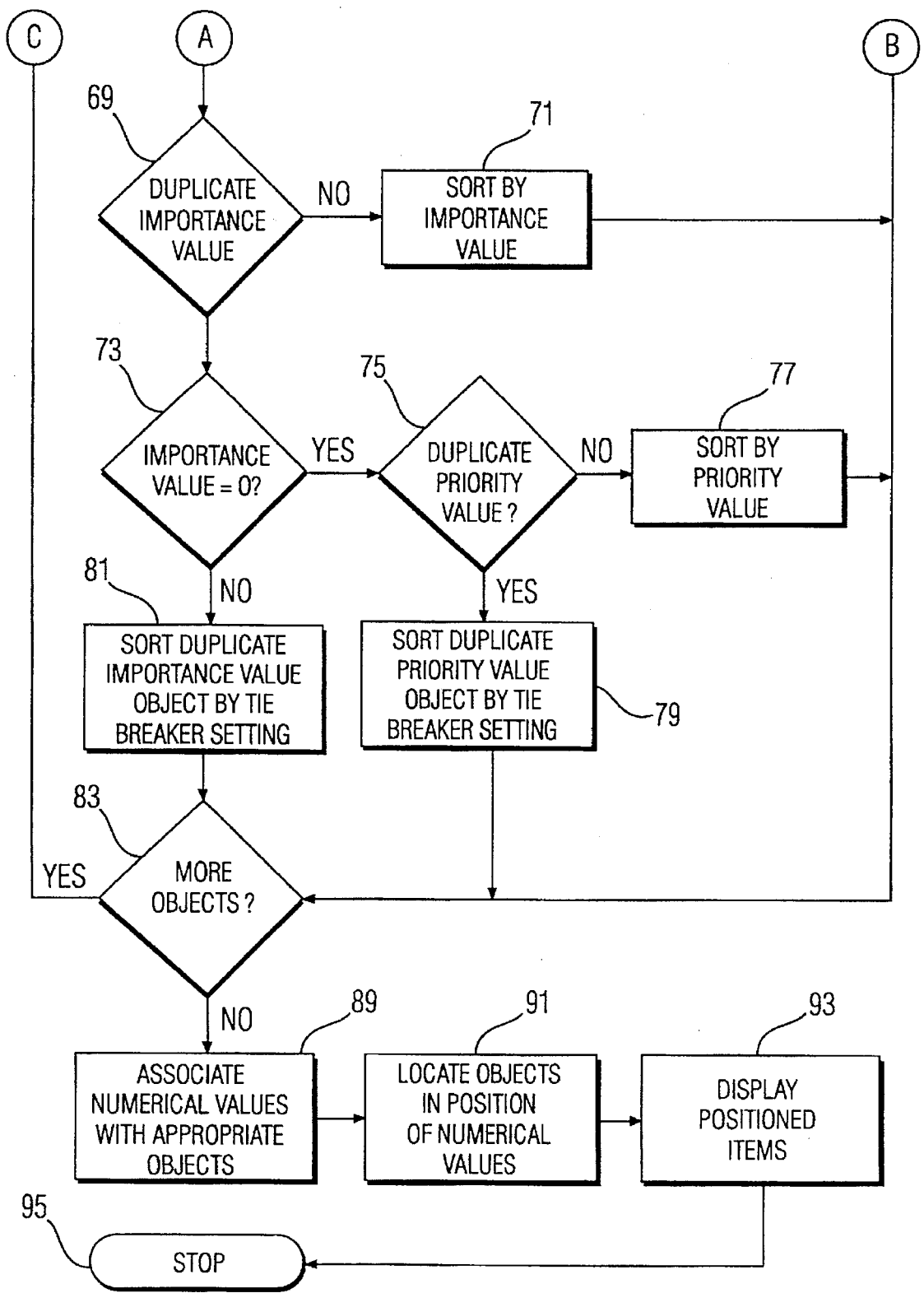

Referring now to FIGS. 2–3b, the method of the present invention will now be described. In the flow charts, the following graphical conventions are observed: a rectangle for either a process, function or screen display, a diamond for a decision and a circle for a connector in exiting from or entering to a flow chart. These conventions are well understood by programmers skilled in the art of user interfaces and the flow charts are sufficient to enable a programmer skilled in the art to write code in any suitable computer programming language, such as BASIC, COBAL, PASCAL or C for a computer such as the IBM Personal System/2 (PS/2) family of computers or other platforms which support these languages.

Generally speaking, the method of FIG. 2 allows a user to edit or enter data such as a due date and a priority value relevant to each item.

In general, the method of FIG. 3 reprtoritizes the calendar items based on their due dates and priority values. The reprioritization occurs on a selected date, such as the current date. A listing is produced wherein the items are listed in order of importance.

The methods of FIGS. 2–3b will now be described more specifically. Referring to FIG. 2, the data entry method starts, step 31, whenever it is invoked by the user. Invocation may be when a well known key is pressed (for example "F8"), while the calendar program is being implemented. In step 33, the method determines if the user wishes to add a new object to the database. If the result of step 33 is YES, then in step 35, the method gets the new object and appends it to the end of existing database objects. Each object includes an item, a due date and a priority value. The item is typically the data or information which is to be displayed. The data or information is not restricted to text. The due date may be expressed in any type of calendar, for example, Julian.

The priority value is an attribute of the object and is used for ordering the object relative to other objects. After step 35, the method stops, step 39.

If the result of step 33 is NO, then the method allows editing of the object in step 37. The object is located and the object information is changed or deleted. After step 37, the method stops, step 39. The application and database may reside on the network 15, the mainframe 25, or any other linked system.

Referring now to FIG. 3a, the reprioritization method will be described. The method starts, step 51, when invoked. Invocation may be manual, such as when a user presses a well known key. Alternatively, invocation may be automatic. For example, the method may be invoked when a user first logs onto a computer 13 each day.

In step 53, the method reads the reprioritization settings and the user's profile. A system administrator provides the reprioritization settings. One or more of these default settings can be changed by an individual user, which changes are stored in the user's profile. The administrator can restrict a user's access to prevent the changing of selected settings.

One such setting is the numeric range for the priority values that can be assigned to an item by a user. For example, 1 equals the highest priority value, while 10 equals the lowest priority value. As an alternative to numbers for priority values, another setting may provide that symbols represent the priority values. The symbols would be ranked in an order according to the ordinal values associated with them. This setting is typically not changed.

Another type of setting is the provision of tie breaker rules. These rules can be used when two or more items have the same importance value or priority value. The tie could be broken using alphabetic sorting, a key word in the item, the date or time that the item was first entered into the database, etc. The user selects the ordinal attributes that will be used for tie breakers.

Still another type of setting is the format of the display of the sorted items. The display may be full screen, or located, for example, in a window. Also, the items may be displayed top to bottom, in descending order of importance, or left to right.

Still another setting is the selected date. The selected date is used in combination with the due date of an item for determining the importance of an item. The selected date is typically the current calendar date or system date. However, the user may choose a future or a past date as the selected date.

Still another setting is the display range. This is a range of days that determines which items are displayed. Items that are too early or late with respect to the selected date fall outside of the display range and are not displayed to the user in the reprioritized listing.

After reading all of the settings provided by the administrator and the user profile, the method proceeds to step 55 to read an object from the data base.

The individual object is then processed in steps 57-83. In step 57, the selected date is subtracted from the due date of the object, to obtain a Difference. In step 59, the absolute value of the Difference is determined. In step 61, the method determines if the absolute value is greater than the display range. If the result of step 61 is YES, then the method bypasses steps 63-79, which determine the relative importance of the object, and proceeds directly to step 83.

If the result of step 61 is NO, then the method proceeds to step 63. In step 63, the method determines if the Difference is less than zero. If the result of step 63 is YES, then the object is past due (that is the due date has passed the selected date) and the past due flag is set, step 65. In step 66, the priority value of the object is inverted according to:

Maximum Priority#−Priority Value+1=Inverted Priority.

In the preferred embodiment, the priority value of a past due object is inverted. This is done to properly use the Difference weighting factor. For example, where the priority values are set from 1 being the highest priority to 10 being the lowest priority, then the maximum priority # is 10. Thus, if an object has a priority value of 3, then the inverted priority=10(maximum priority #)−3 (priority value)+1=8. The inverted priority is not stored in the object database. Instead, it is used in the determination of the past due object's Importance value. Because of the inversion step, the priority values of all objects are positive integers, ranging from a 1 (lowest priority) to 10 (highest priority). After step 66, or if the result of step 63 is NO, the method proceeds to step 67.

In step 67 the Importance value of the object is determined by multiplying the Difference by the priority value. The Difference (as opposed to the absolute value) could be a negative value. The Importance value is an indication of the priority of an object, which priority is weighted by a temporal factor. The Importance value therefore gives an indication of the urgency, or lack thereof, of an object.

In step 69, FIG. 3b, the method determines if there are any duplicate Importance values in those objects that have been processed by step 67. If the result of step 69 is NO, then the method sorts the objects by their importance value, step 71. After step 71, the method proceeds to step 83.

If the result of step 69 is YES, then the method proceeds to step 73 to sort the objects by something other than the Importance values. In step 73, the method determines for the object that has just been processed by step 69, if the Importance value is zero. If the result of step 73 is YES, then the method proceeds to step 75 to possibly sort the objects by priority values. This is because it is typical that duplicate Importance values have duplicate due dates and priority values. However, if the Importance value is zero, then the due date is the same as the selected date. Thus, the priority values could be different. In step 75, the method determines, for those objects that have been processed so far, if there are any duplicate priority values. If the result of step 75 is NO, then in step 77, those objects having Importance values equal to zero are sorted by their priority values. After step 77, the method proceeds to step 83.

However, if the result of step 75 is YES, then priority values cannot be used to sort the objects. In step 79, the method sorts the objects having duplicate Importance values as well as duplicate priority values by the tie breaker settings, which are read in step 53. After step 79, the method proceeds to step 83.

If the result of step 73 is NO, then the method proceeds to step 81 where the objects having the duplicate Importance values are sorted by their tie breaker profile settings. After step 81, the method proceeds to step 83.

In step 83, the method determines if there are any more objects. If the result of step 83 is YES, then the method returns to step 55 to read another object.

If the result of step 83 is NO, then the method proceeds to step 89, where the method associates the Importance values with those objects which are to be displayed. Step 89 is performed because the Importance values are a derived field. Those objects which have an absolute value for the Difference that is greater than the display range are not displayed.

In step 91, a display is built by placing the objects in the order as determined by the ranking of the Importance values, which ranking was performed by the sorting operations. In step 93, the items are then displayed. The due dates and priority values could be displayed as well. After step 93, the method stops, step 87.

To explain the operation of the present invention, an example will be given with the following settings and user profile: a user wishes to see the user's prioritized calendar items for a selected date of Jul. 14, 1993. The user sets the display range to 5 and the profile sort rule to use times of entry for the items when the importance values are equal. Priority values are set from 1 (highest priority) to 10 (lowest priority). The positioning of the items is from top (highest importance) to bottom (lowest importance).

The following are the user's current objects in the data base:

| # | Data/Information | Due date | Priority value |
| --- | --- | --- | --- |
| 1 | Finish spreadsheet for boss | 07/16/93 | 2 |
| 2 | Call broker | 07/14/93 | 2 |
| 3 | Complete Program testing for team | 07/12/93 | 6 |
| 4 | Complete problem report for IBM | 07/15/93 | 1 |
| 5 | Start flowchart for PATENT idea | 07/19/93 | 3 |
| 6 | Analyze competitor data for graph | 07/16/93 | 1 |
| 7 | Finish presentation for Infomart | 07/29/93 | 2 |
| 8 | Gather data for problem report | 07/09/93 | 9 |
| 9 | Buy relative a birthday gift | 07/19/93 | 4 |
| 10 | Turn in survey results | 07/14/93 | 2 |
| 11 | Discuss probable problem areas | 07/05/93 | 2 |

Item 1 is read from the data base, step 55. The selected date (Jul. 14, 1993) is subtracted from the due date (Jul. 16, 1993) to produce a difference of 2, step 57. The absolute value of the difference is less than the display range of 5, so that the method proceeds to determine the importance value, step 61. The importance value is determined by multiplying the difference (2) by the priority value (2), producing an importance value of 4. The importance values for the other items are:

| # | DIFFERENCE | ABSOLUTE | PRIORITY VALUE (Inverted) | IMPORTANCE |
| --- | --- | --- | --- | --- |
| 1 | 2 | 2 | 2 | 4 |
| 2 | 0 | 0 | 2 | 0 |
| 3 | −2 | 2 | 6 (5) | −10 |
| 4 | 1 | 2 | 1 | 1 |
| 5 | 5 | 5 | 3 | 15 |
| 6 | 2 | 2 | 1 | 2 |
| 7 | 15 | 15 | 2 | do not sort |
| 8 | −5 | 5 | 9 (2) | −10 |
| 9 | 5 | 5 | 4 | 20 |
| 10 | 0 | 0 | 2 | 0 |
| 11 | −11 | 11 | 2 | do not sort |

Items 7 and 11 are not given an importance value because their due dates are more than 5 days from the selected date and are therefore outside of the display range. Therefore, items 7 and 11 are not displayed to the user. The items are sorted to produce the following order:

| IMPORTANCE | ITEM # |
| --- | --- |
| −10 | 8 |
| −10 | 3 |
| 0 | 2 |
| 0 | 10 |
| 1 | 4 |
| 2 | 6 |
| 4 | 1 |
| 15 | 5 |
| 20 | 9 |

Items 8 and 3 have duplicate non-zero importance values. However, the profile sort rule (which is executed in step 79) requires the entry date for the items to be used. Item 8 has an earlier entry date (not shown) and is therefore ranked before item 3 in terms of importance.

Items 2 and 10 have Importance values of zero (step 73). Also, they do not have duplicate priority values (step 75). Therefore, they are sorted using the profile sort rule (step 79).

The items are ranked with negative importance values having the highest ranking, zero importance values having intermediate ranking and positive importance values having the lowest rankings.

After sorting, the items are displayed to the user on the screen 17 as follows:

Gather data for problem report—>PAST DUE

Complete program testing for team—>PAST DUE

Call Broker

Turn in survey results

Complete problem report for IBM

Analyze competitor data for graph

Finish spreadsheet for boss

Start flowchart for PATENT idea

Buy relative a birthday gift

The above list presents to the user a reprioritized listing of the items based on their importance values (which is determined from their due dates and priority values). The importance value of each object not only takes into account the priority value assigned by the user, but also the amount of time from the selected date (which is the day used to make the reprioritization) to the due date. The closer the due date is to the selected date, the higher the importance value. If the due date has passed the selected date, then an even higher importance value is assigned. In this manner, items are prioritized dynamically.

In addition, the first two items are flagged with "PAST DUE" notices, indicating that these items have already slipped past the selected date. The user is thus put on notice that the first two items have the highest importance.

The foregoing disclosure and the showings made in the drawings are merely illustrative of the principles of this invention and are not to be interpreted in a limiting sense.

What we claim is:

1. A method for reprioritizing calendar objects on a data processing system for a selected date, comprising the steps of:
   a) obtaining said objects from a database on said data processing system, each of said objects having a due date and a priority value;
   b) for each object, determining a difference between said respective due date and said selected date and weighting said respective priority value by said difference to determine an importance of said object; and
   c) prioritizing said objects according to the importance of each object.

2. The method of claim 1, further comprising the steps of:
   a) determining if two objects have the same importance; and
   b) if two objects have the same importance, then prioritizing said two objects by a predetermined parameter associated with said objects.

3. The method of claim 1, further comprising the steps of:
   a) determining if said two objects have the same importance; and
   b) if so, then prioritizing said two objects by their respective priority values.

4. The method of claim 1, further comprising the step of producing a list of said prioritized objects to a user.

5. The method of claim 4, further comprising the step of flagging for said user those objects having a due date that is past said selected date.

6. The method of claim 4, wherein said step of producing a list of said prioritized objects to a user further comprises the step of producing a list of those objects having the respective due dates located within a predetermined range from said selected date.

7. A data processing system for reprioritizing calendar objects for a selected date, comprising:
   a) means for obtaining said objects from a database on said data processing system, each of said objects having a due date and a priority value;
   b) means for determining a difference between said respective due date and said selected date for each object and for weighting said respective priority value by said difference to determine an importance of said respective object; and
   c) means for prioritizing said objects according to the importance of each object.

8. The data processing system of claim 7, further comprising:
   a) means for determining if two objects have the same importance; and
   b) means for prioritizing said two objects by a predetermined parameter associated with said objects if said two objects have the same importance.

9. The data processing system of claim 7, further comprising:
   a) means for determining if said two objects have the same importance; and
   b) means for prioritizing said two objects by their respective priority values if said two objects have the same importance.

10. The data processing system of claim 1, further comprising means for producing a list of said prioritized objects to a user.

11. The data processing system of claim 10, further comprising means for flagging for said user those objects having a due date that is past said selected date.

12. The data processing system of claim 10, wherein said means for producing a list of said prioritized objects to a user further comprises means for producing a list of those objects having the respective due dates located within a predetermined range from said selected date.

* * * * *